July 26, 1966 J. C. BALDER ETAL 3,263,094

CIRCUIT ARRANGEMENT FOR SEPARATING SIGNALS

Filed Dec. 23, 1963

INVENTORS
JOHAN C. BALDER,
EELTJE DE BOER &
BY GERARDUS JJ. MOONEN
Frank R. Jefari
AGENT

3,263,094
CIRCUIT ARRANGEMENT FOR SEPARATING SIGNALS

Johannes Cornelis Balder, Eeltje de Boer, and Gerardus Johannes Jacobus Moonen, all of Emmasingel, Eindhoven, Netherlands, assignors to North American Philips Company, Inc., New York, N.Y., a corporation of Delaware Filed Dec. 23, 1963, Ser. No. 332,454
Claims priority, application Netherlands, Dec. 27, 1962, 287,235
3 Claims. (Cl. 307—88.5)

The invention relates to a circuit arrangement for separating signals, the amplitude of which lies within two limit values, from signals having an amplitude lying beyond the range determined by said limit values.

Known arrangements of this kind are equipped with electron valves or transistors, so that they operate with a certain amount of inertia. Moreover, stabilization of such arrangements is difficult.

The invention has for its object to obviate these disadvantages by using tunnel diodes. It is characterized in that the signals are supplied to the junction of a first pair of tunnel diodes, the unlike electrodes of which are interconnected and which are supplied by voltages in phase opposition and in that the signals are furthermore supplied in phase opposition to the junction of a second pair of tunnel diodes, which are interconnected by their unlike electrodes and which are supplied by voltages in phase opposition, and in that setting currents are supplied to the junction of the first pair and to the junction of the second pair of tunnel diodes, the value and the polarity of said currents being different.

According to a further feature of the invention the setting currents are constant and have a small difference in value.

Figure 1:
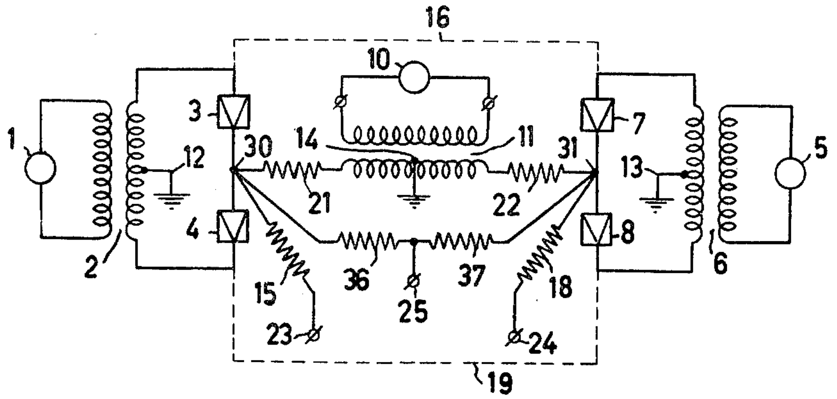
Figure 2:
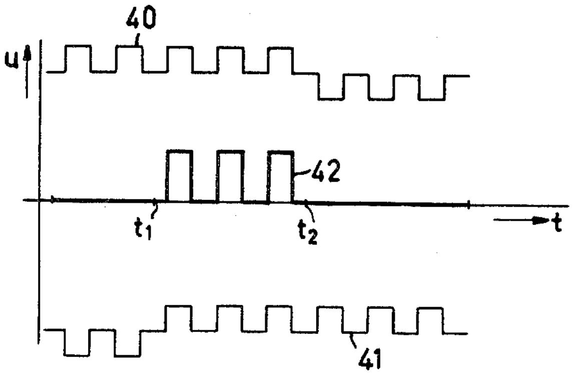

The invention will be described with reference to the drawing, in which FIG. 1 shows the principal diagram of an arrangement according to the invention and FIG. 2 shows voltage-time diagrams for explaining the operation of the arrangement of FIG. 1.

In the arrangement shown in FIG. 1 the alternating-voltage supply signal from the source 1, which signal may have the form of a sine wave or a square wave, is supplied via the push-pull transformer 2, the secondary of which has an earth-connected central tapping, to the series combination of the tunnel diodes 3 and 4. These tunnel diodes are interconnected by their unlike electrodes. The alternating-voltage supply signal has such a value and polarity that the tunnel diodes 3 and 4 are operative, during the presence thereof, in the part of their current-voltage characteristic curves which has a negative slope.

The invention utilizes the recognition known per se that the polarity of a signal, derived from the junction of two tunnel diodes, the unlike electrodes of which are interconnected and which are supplied in phase opposition, is equal to the polarity of a control-signal fed to the junction.

Not only at the junction 30 of the tunnel diodes 3 and 4 but also at the junction 31 of the tunnel diodes 7 and 8, which are connected in the same manner as the tunnel diodes 3 and 4, and are fed by a source 5, there is injected an input signal, which emanates from an alternating voltage source 10 and is fed in phase opposition to the junctions via a transformer 11, having a secondary winding the central tapping of which is at a constant potential, particularly earth potential.

In accordance with the invention setting currents of different values and polarities are, in addition, injected at the junctions 30 and 31. In accordance with a feature of the invention these setting currents are constant and have little difference in value; this means, the difference in values is small as compared with the peak current of each tunnel diode. Thus the terminal 23 receives a negative, constant setting current $-(i-\Delta i)$ and the terminal 24 a positive, constant setting current $+(i+\Delta i)$. If the amplitude of the signal of the source 10 is smaller than $i-\Delta i$, a negative or a positive current is fed from the junction 30 or 31 respectively to the output terminal 25. With suitably chosen tunnel diodes and/or resistors 36 and 37 these currents compensate each other completely. This is also the case, when the amplitude of the signal from the source 10 exceeds $i+\Delta i$, since then a positive or a negative current is produced at the junction 30 or 31 respectively. These two currents compensate each other.

If, however, for instance between the instants $t_1$ and $t_2$ (cf. FIG. 2), the amplitude of the signal lies between $i-\Delta i$ and $i+\Delta i$, a positive current appears at the two junctions, so that the sum of these positive currents appears at the terminal 25.

In FIG. 2 the curve 40 represents the curve at the terminal 25 from the tunnel diodes 3 and 4; the curve 41 represents the current from the tunnel diodes 7 and 8 at the terminal 25 and the curve 42 represents the total current at the terminal 25. Between the instants $t_1$ and $t_2$ a sequence of pulses is thus available.

In one embodiment, elements 3, 4, 7 and 8 were germanium tunnel diodes of an experimental type, having a peak current of 5 ma. and an associated voltage of 55 mv. and a valley current of 0.5 ma. and an associated voltage of 350 mv. The sources 1 and 5 supplied square-wave voltages of 0.2 v. with a repetition frequency of 10 mc./s. The source 10 supplied voltages, the amplitude of which varied between 0 and 0.2 v., the repetition frequency being 1 mc./s. The resistors 15 and 18 had values of 1 kΩ each, the resistors 21 and 22 values of 100 ohms each and the resistors 36 and 37 values of 390 ohms each. A negative current of 100 μa. was fed to the terminal 23 and a positive current of 300 μa. was fed to the terminal 24. At the terminal 25 groups of pulses were available which had a value of 100 mv. and a repetition frequency of 10 mc./s., when the amplitude of the signal from 10 varied over a range of 200 μa.

Since the supply signals for the pairs of tunnel diodes must be in co-phase, it is advisable to use the same voltage source, both for the pair 3, 4 and the pair 7, 8. In fact this is obtained by connecting the pair 7, 8 via the connections 16 and 19, indicated in broken lines in FIG. 1, to the secondary winding of the transformer 2 and by interrupting the connection to the secondary winding of the transformer 6.

A number of these separation circuits may be connected in parallel. If the limit values for each circuit are chosen differently, sequences of pulses will be available at the output on a number of levels equal to the number of circuits. It is desirable in this case to provide decoupling, for example by using emitter followers before and after the pairs of tunnel diodes.

As a matter of course, setting currents of the same polarity may be fed to the junctions 30 and 31. The input signal, which has a polarity opposite that of the setting current, is then supplied in the same phase to the junctions of the diodes. Either a signal A (if the input signal is smaller than the lower setting current), or no signal (if the input signal lies between the two setting currents) or a signal B having a polarity unlike that of the signal A (if the input signal exceeds the higher setting current) appears at the output terminal.

What is claimed is:

1. An electrical circuit arrangement for selectively transmitting a signal having an amplitude between first and second limiting values, comprising a first pair of tunnel diodes connected in series with unlike electrodes connected together to form a first junction, a second pair of tunnel diodes connected in series with unlike electrodes connected together to form a second junction, means for applying an alternating voltage in phase opposition to the ends of each of said pairs of diodes, means for applying said signal in given phase to said first junction and to the second junction in phase opposition, means for applying to said first junction a first setting potential of given polarity and amplitude, means for applying to said second junction a second setting potential of polarity and amplitude different from the polarity and amplitude of said first setting potential, means for combining the voltages at said first and second junctions, and means for deriving said transmitted signal from said combining means.

2. An electrical circuit arrangement as claimed in claim 1 wherein said setting potentials are constant in value and have an amplitude difference substantially equal to the difference between said first and second limiting values.

3. An electrical circuit arrangement for selectively transmitting a signal having an amplitude between first and second limiting values, comprising a first pair of tunnel diodes connected in series with unlike electrodes connected together to form a first junction, a second pair of tunnel diodes connected in series with unlike electrodes connected together to form a second junction, center tapped winding means for applying an alternating voltage in phase opposition to the ends of each of said pairs of diodes, center tapped winding means for applying said signal to said first junction in given phase and to the second junction in phase opposition, means for applying to said first junction a first setting potential of given polarity and amplitude, means for applying to said second junction a second setting potential of opposite polarity to said first potential and greater than said first setting potential by an amount substantially equal to the difference between said first and second limiting values, impedance means provided with a tap and interconnecting said first and second junctions, and means for deriving said transmitted signal from said tap.

References Cited by the Examiner

UNITED STATES PATENTS

| | | | |
|---|---|---|---|
| 3,120,653 | 2/1964 | Miller et al. | 307—88.5 X |
| 3,138,723 | 6/1964 | Goto | 307—88.5 |

OTHER REFERENCES

Balder et al.: "Video Transmission . . . Using Tunnel Diodes," Proc. IRE, April 1962, pp. 428–431 relied on.

ARTHUR GAUSS, *Primary Examiner.*

D. D. FORRER, *Assistant Examiner.*